US012762481B2

(12) United States Patent
Sethi et al.

(10) Patent No.: US 12,762,481 B2
(45) Date of Patent: Oct. 13, 2026

(54) REPLACEMENT COMPONENT MANAGEMENT USING MACHINE LEARNING

(71) Applicant: Dell Products L.P., Round Rock, TX (US)

(72) Inventors: Parminder Singh Sethi, Ludhiana (IN); Lakshmi Saroja Nalam, Bangalore (IN); Vasanth Sathyanarayanan, Bangalore (IN); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 370 days.

(21) Appl. No.: 18/637,890

(22) Filed: Apr. 17, 2024

(65) Prior Publication Data

US 2025/0328809 A1 Oct. 23, 2025

(51) Int. Cl.
*G06N 20/00* (2019.01)

(52) U.S. Cl.
CPC .................................... *G06N 20/00* (2019.01)

(58) Field of Classification Search
USPC ........................................................... 706/12
See application file for complete search history.

(56) References Cited

U.S. PATENT DOCUMENTS

2021/0281215 A1* 9/2021 Lin ........................ H10F 19/908

OTHER PUBLICATIONS

Mathias Robert, Artificial Intelligence, Predictive Maintenance and Patents, 2021 (Year: 2021).*
T. N. Kipf et al., "Graph Convolutional Network," https://paperswithcode.com/method/gcn, Accessed Apr. 12, 2024, 5 pages.
T. N. Kipf et al., "Semi-Supervised Classification with Graph Convolutional Networks," arXiv:1609.02907v4, Feb. 22, 2017, 14 pages.

* cited by examiner

*Primary Examiner* — Tarek Elchanti
(74) *Attorney, Agent, or Firm* — Ryan, Mason & Lewis, LLP

(57) ABSTRACT

A method comprises predicting one or more device types for which one or more components thereof will be replaced, wherein the predicting is performed using at least a first machine learning algorithm, identifying locations of respective devices of a plurality of devices corresponding to the one or more device types, and determining one or more component distribution sources that are in proximity to the locations of the respective devices, wherein the determining is performed using at least a second machine learning algorithm. At least one device of the respective devices qualifying for at least one replacement component is identified. The method further comprises causing dispatching of the at least one replacement component to a location of the at least one device from a component distribution source of the one or more component distribution sources in proximity to the location of the at least one device.

20 Claims, 6 Drawing Sheets

REPLACEMENT COMPONENT MANAGEMENT USING MACHINE LEARNING

FIELD

The field relates generally to information processing systems, and more particularly to machine learning-based replacement component management in such information processing systems.

BACKGROUND

Enterprises may authorize replacement of device components when such devices and/or components malfunction or become inoperable. With current approaches, device components are shipped from a single central factory without consideration of the real-time location of the customer and the corresponding device. The conventional approaches result in excessive use of resources and longer system downtimes, especially when shipments are over long distances. Additionally, current approaches are reactive to component failures, and are not capable of identifying when components may fail, thereby limiting an enterprise's ability to prevent and/or minimize adverse effects of such failures.

SUMMARY

Embodiments provide a replacement component management platform in an information processing system.

For example, in one embodiment, a method comprises predicting one or more device types for which one or more components thereof will be replaced, wherein the predicting is performed using at least a first machine learning algorithm, identifying locations of respective devices of a plurality of devices corresponding to the one or more device types, and determining one or more component distribution sources that are in proximity to the locations of the respective devices, wherein the determining is performed using at least a second machine learning algorithm. At least one device of the respective devices qualifying for at least one replacement component is identified. The method further comprises causing dispatching of the at least one replacement component to a location of the at least one device from a component distribution source of the one or more component distribution sources in proximity to the location of the at least one device.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous, and a user device receives messages without any significant time delay. Of course, it should be understood that depending on the particular temporal nature of the system in which an embodiment is implemented, other appropriate timescales that provide at least contemporaneous performance and output can be achieved.

Figure 1:
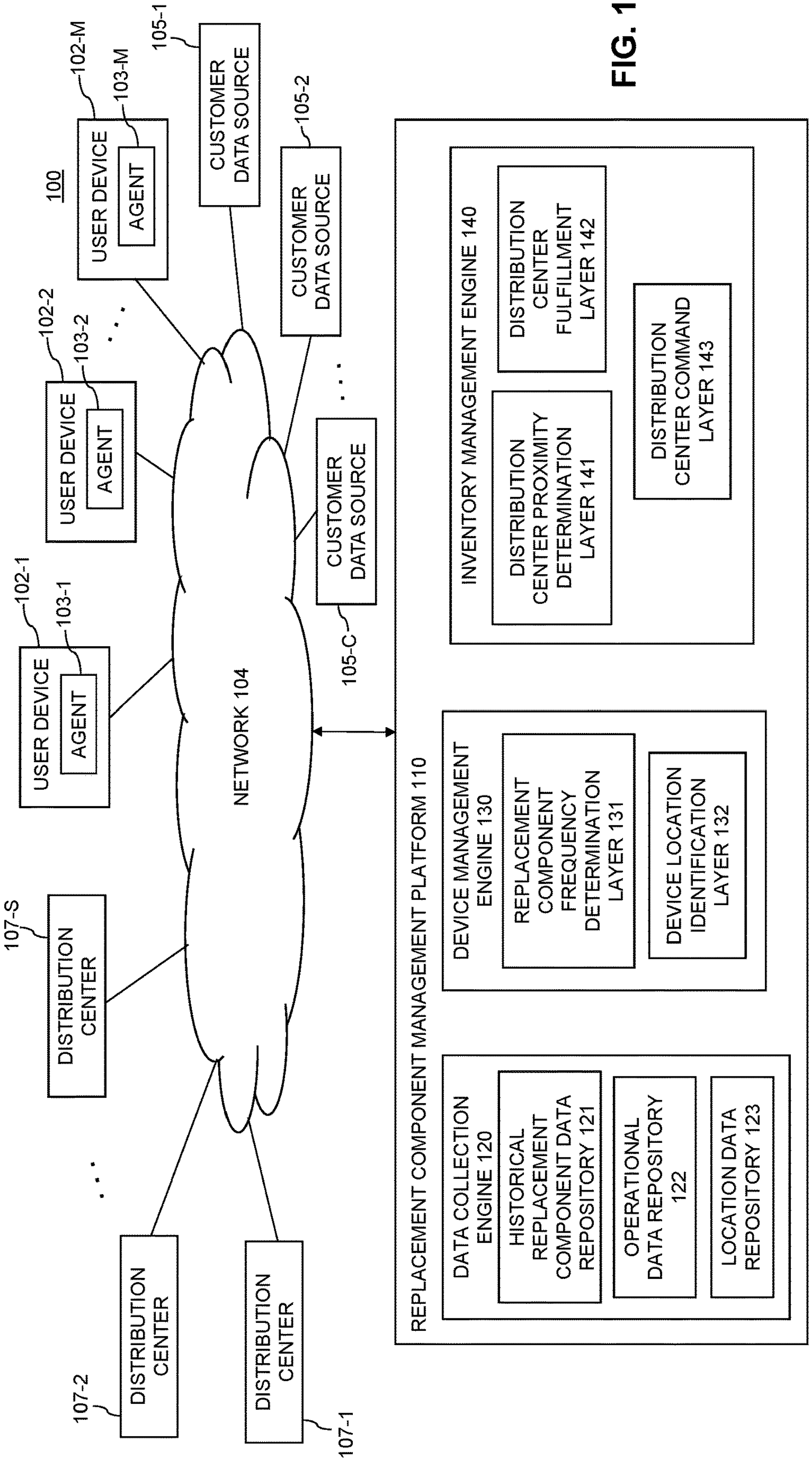
FIG. 1 depicts an information processing system with a replacement component management platform for predicting replacement component demand and identifying locations of corresponding devices in an illustrative embodiment.

FIG. 1 shows an information processing system 100 configured in accordance with an illustrative embodiment. The information processing system 100 comprises user devices 102-1, 102-2, . . . 102-M (collectively "user devices 102"), customer data sources 105-1, 105-2, . . . 105-C (collectively "customer data sources 105") and distribution centers 107-1, 107-2, . . . 107-S (collectively "distribution centers 107"). A distribution center 107 is an example of a distribution source. As used herein, a "distribution source" can refer to, for example, a repair center, a component and/or parts distribution center, a warehouse, a store, a technical support location or other location or hub from which replacement components may be dispatched. As explained in more detail herein, the user devices 102 comprise respective agents 103-1, 103-2, . . . 103-M (collectively "agents 103"). The agents 103 comprise software agents and one or more APIs that are deployed on the user devices 102 to, for example, monitor the operation of the user devices 102, to collect data corresponding to the operation of the user devices 102 and to collect data corresponding to the location of the user devices 102.

The user devices 102, devices of the customer data sources 105 and devices of the distribution centers 107 communicate over a network 104 with a replacement component management platform 110. The variable M and other similar index variables herein such as C, K, L and S are assumed to be arbitrary positive integers greater than or equal to one. The user devices 102, devices of the customer data sources 105 and devices of the distribution centers 107 comprise, for example, desktop, laptop or tablet computers, servers, host devices, storage devices, mobile telephones, Internet of Things (IoT) devices or other types of processing devices capable of communicating with the replacement component management platform 110 over the network 104. Such devices are examples of what are more generally referred to herein as "processing devices." Some of these processing devices are also generally referred to herein as "computers." The user devices 102, devices of the customer data sources 105 and devices of the distribution centers 107 may also or alternately comprise virtualized computing resources, such as virtual machines (VMs), containers, etc. The user devices 102, devices of the customer data sources 105 and devices of the distribution centers 107 in some embodiments comprise respective computers associated with a particular company, organization or other enterprise.

The terms "user," "customer," "client," "personnel" or "administrator" herein are intended to be broadly construed so as to encompass numerous arrangements of human, hardware, software or firmware entities, as well as combinations of such entities. Replacement component management services may be provided for users utilizing one or more machine learning models, although it is to be appreciated that other types of infrastructure arrangements could be used. At least a portion of the available services and functionalities provided by the replacement component management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the replacement component management platform 110, as well as to support communication between the replacement component management platform 110 and connected devices (e.g., user devices 102, devices of the customer data sources 105 and devices of the distribution centers 107) and/or other related systems and devices not explicitly shown.

In some embodiments, the user devices 102, devices of the customer data sources 105 and devices of the distribution centers 107 are assumed to be associated with repair and/or support technicians, system administrators, information technology (IT) managers, software developers, release management personnel or other authorized personnel configured to access and utilize the replacement component management platform 110.

The replacement component management platform 110 in the present embodiment is assumed to be accessible to the user devices 102, devices of the customer data sources 105 and devices of the distribution centers 107 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the replacement component management platform 110 includes a data collection engine 120, a device management engine 130 and an inventory management engine 140. The data collection engine 120 includes a historical replacement component data repository 121, an operational data repository 122 and a location data repository 123. The device management engine 130 comprises a replacement component frequency determination layer 131 and a device location identification layer 132. The inventory management engine 140 comprises a distribution center proximity determination layer 141, a distribution center fulfilment layer 142 and a distribution center command layer 143.

Figure 2:
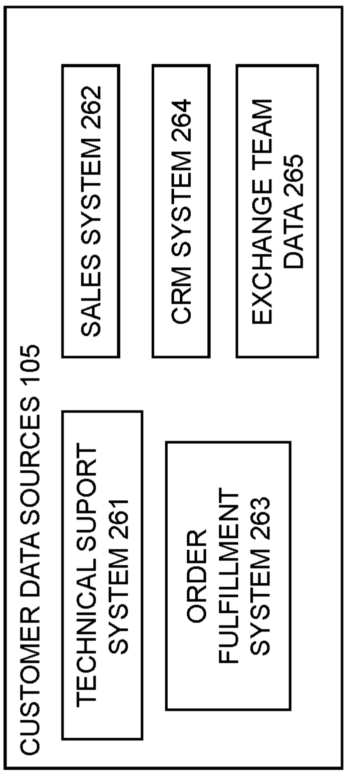
FIG. 2 depicts customer data sources in an illustrative embodiment.

The data collection engine 120 collects data from one or more agents 103, from one or more customer data sources 105 and from one or more distribution centers 107. Referring to FIG. 2, in a non-limiting illustrative embodiment, the customer data sources 105 comprise, for example, one or more of a technical support system 261, a sales system 262, an order fulfillment system 263 (e.g., supply chain), a customer relationship management (CRM) system 264 and exchange team data 265. In illustrative embodiments, the data collection engine 120 performs data engineering and data pre-processing to identify the features and the corresponding data elements that will be influencing the predictions made by the device management engine 130 and the inventory management engine 140. In illustrative embodiments, the data engineering and data pre-processing includes generating multivariate plots and correlation heatmaps to identify the significance of each feature in the collected data, and filter less important data elements. The data engineering and data pre-processing reduces the dimensions and complexity of the machine learning algorithms, hence improving the accuracy and performance of the algorithms. In some embodiments, the data engineering and data pre-processing includes cleaning any unwanted characters and stop words from the data, performing stemming and lemmatization, as well as changing text to lower case, removing punctuation, and removing incorrect or unnecessary characters. In some embodiments, textual values and changed to numerical values for appropriate processing by the machine learning algorithms.

The data may be collected from the agents 103, customer data sources 105 and distribution centers 107 and/or from applications used for monitoring, mining and/or pulling data from the agents 103, customer data sources 105 and distribution centers 107. The data comprises, for example, historical data regarding replacement of components for devices and device types (referred to herein as "replacement component fulfillment data"), which includes for example, device models, operating system versions, component models and component firmware versions corresponding to components that have been replaced. This data may be stored in the historical replacement component data repository 121. Details about times for installation and testing of replaced components, and details about related components that require replacement as a result of another component being replaced (e.g., a motherboard must be replaced if a defective memory requiring replacement is soldered to the motherboard) may also be collected by the data collection engine 120 and stored in the historical replacement component data repository 121.

The collected data also includes operational data trends leading to component replacement such as, for example, central processing unit (CPU) utilization, memory utilization, input-output utilization over designated time periods where operation of components is degrading and/or leading up to component failure. This data may be stored in the operational data repository 122.

The data further includes information detailing the locations of particular devices and/or devices for which components have been replaced, distribution center location details, legal and/or administrative restrictions associated with certain locations and/or borders, and technician or service availability in certain regions and/or areas. This data may be stored in the location data repository 123.

The data collection engine 120 harvests customer data from the customer data sources 105, and stores the harvested customer data one or more of the repositories 121, 122 and 123. In illustrative embodiments, harvesting the customer data from the customer data sources 105 comprises extracting features from the customer data such as, for example, customer, product, type of transaction, location, region, and/or operation outcomes (e.g., delivery details such as delay and damage). Customer data can also include customer address data including, for example, information on whether a dispatch address for a replacement component is different from the original shipping address, and information on a number of products not received from a particular address. In addition, as noted above, the data collection engine 120 collects operational and location data of the user devices 102 from the agents 103. For example, an agent 103 may monitor the health of various components of a user device 102. Health monitoring can include, for example, device or component crash data, and details about processing failures, data transmission failures, decreases in throughput, increases in latency and increased CPU and memory utilization. The location data retrieved by the data collection engine from, for example, the agents 103 and/or devices of the distribution centers 107 can include, for example, network data, global positioning system (GPS) data, Internet Protocol (IP) addresses, nearby WiFi hotspot details, and cellular tower details.

According to one or more embodiments, the data can be collected at pre-defined time intervals set by, for example, one or more data collection applications such as, but not necessarily limited to, SupportAssist Enterprise available from Dell Technologies. In some embodiments, the data collection engine 120 receives pushed data or pulls data from the agents 103, customer data sources 105, distribution centers 107 and/or from data collection applications. The machine learning algorithms of illustrative embodiments analyze multiple factors from data collected by the data collection engine 120. The collected data is further used to train the machine learning algorithms.

As noted herein above, with current approaches, device components are shipped from a single central factory without consideration of the real-time location of the customer and the corresponding device, thereby resulting in excessive use of resources and longer system downtimes, especially when shipments are over long distances.

Illustrative embodiments provide a machine learning-based model to determine the demand for components to be replaced based on the device type and monitored real-time operational data. Advantageously, the embodiments determine the real-time locations of devices and component distribution centers in proximity to the real-time locations so that replacement components can be efficiently dispatched prior to component failure or, at the very least, in a relatively short period of time following a failure.

Figure 3:
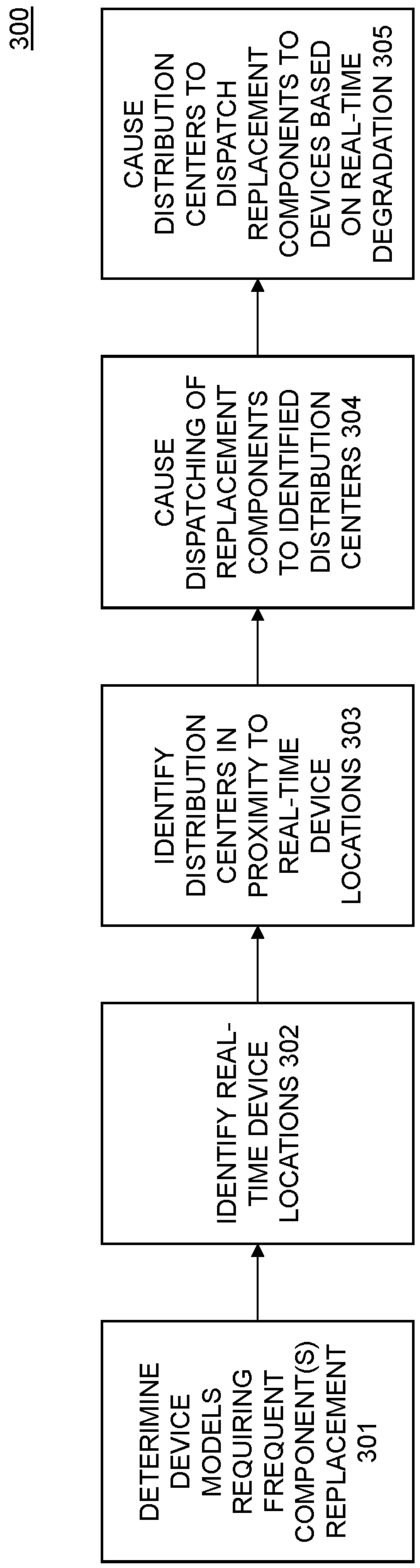
FIG. 3 depicts an operational flow for replacement component demand prediction and device location identification in an illustrative embodiment.

Referring, for example, to the operational flow 300 in FIG. 3, device models requiring frequent replacement of components are determined (step 301). The determination is based at least in part on replacement component fulfillment data including, for example, device models, operating system versions, component models and component firmware versions corresponding to components that have been replaced. The determination is made using, for example, a multiple linear regression algorithm that has been trained with the replacement component fulfillment data. In illustrative embodiments, the multiple linear regression algorithm considers values of multiple independent variables and predicts a target variable/output variable. In more detail, some non-limiting examples of the independent variables comprise, for respective device types, a device model, one or more component models, one or more component firmware versions, CPU utilization, memory utilization, input-output utilization, other firmware versions and operating system version. The target variable/output variable can be a binary output indicating yes or no whether component replacement is required.

In illustrative embodiments, a sampling method (e.g., probability sampling) can be used to randomly select samples to be analyzed. The replacement component frequency determination layer 131 uses a multiple linear regression algorithm in accordance with the following equation (1):

$$y=\beta_0+\beta_1x_1+\beta_2x_2+ \ldots \beta_px_p+\varepsilon \quad (1)$$

where y is predicted value of the dependent variable (target variable/output variable), $\beta_0$ is the y-intercept (value of y when all other parameters are set to 0), $\beta_1x_1$ represents the regression coefficient ($\beta_1$) of a first independent variable ($x_1$), $\beta_2x_2$ represents the regression coefficient ($\beta_2$) of a second independent variable ($x_2$), $\beta_px_p$ represents the regression coefficient ($\beta_p$) of a last independent variable ($x_p$), and $\varepsilon$ is a model error (variation in an estimate of y). P corresponds to an integer greater than or equal to 1 depending on the number of independent variables.

The replacement component frequency determination layer 131 inputs operational data (e.g., real-time CPU utilization, memory utilization, input-output utilization, device or component crash data, details about processing failures, data transmission failures, decreases in throughput, increases in latency and increased CPU and memory utilization) for multiple devices of different device types to the trained multiple linear regression algorithm. Based on the inputted operational data, the trained algorithm predicts those device models that will require frequent replacement of components. In this case, "frequent replacement" refers to the number of devices corresponding to a given device model found to require replacement components exceeding a designated threshold number of devices. In illustrative embodiments, if a component requires replacement, the replacement component frequency determination layer 131 can determine whether related components would also require replacement based on the defective component and device configuration. For example, a motherboard may also need to be replaced in certain device models having a defective memory where the memory is soldered on the motherboard.

At step 302, once the device models requiring frequent replacement of components are determined, the real-time locations of devices corresponding to the determined device models are identified. In more detail, the device location identification layer 132 determines a shipping location of a device using, for example, customer data available in a sales system 262 or other customer data source 105. The device location identification layer 132 determines the real-time location (e.g., address) of a device based on data received from an agent installed on the device (e.g., agent 103 on a user device 102). The location data collected from the agent can include, for example, network data, GPS data, IP addresses, nearby WiFi hotspot details, and cellular tower details. Based on the received agent data, the device location identification layer 132 determines the real-time location of a device. In illustrative embodiments, the device location identification layer 132 computes a length of time a given device has been in a given location, and if the length of time exceeds a designated threshold length of time (e.g., 1 month, 3 months, etc.), the device location identification layer 132 will determine that the location is a valid location. For example, in some situations, a device (e.g., a portable computer) may be in a temporary location that is not its permanent location for a short period of time (e.g., less than the threshold). Determining whether the length of time a given device has been in a given location exceeds a designated threshold length of time avoids an incorrect location determination based on a temporary location. In some embodiments, the device location identification layer 132 compares the real-time location to the shipping location of a device, and if there is a match, the device location identification layer 132 may conclude that the real-time location accurately reflects the device's permanent location.

At step 303, the distribution center proximity determination layer 141 identifies distribution centers 107 in proximity to the real-time device locations. In accordance with illustrative embodiments, the identification of distribution centers 107 in proximity to the real-time device locations is performed using a graph convolutional network, one or more decision trees and/or a k-nearest neighbor (KNN) algorithm. For example, based on distribution center location data in a sales system or other customer data source, the graph convolutional network identifies distribution centers 107 in proximity to the real-time device locations. A graph convolutional network is a variant of a convolutional neural network that performs semi-supervised learning on graph-structured data. The model may scale linearly in the number of graph edges and learn hidden layer representations that encode a local graph structure and features of nodes.

In illustrative embodiments, decision trees, trained based on customer and replacement component dispatchment data (available, for example, in customer data sources 105), can be used to determine the distribution centers 107 that are in proximity to the real-time device locations. The decision trees are part of a supervised machine learning algorithm used for classification. In illustrative embodiments, the decision trees are used to separate data points and order classes on a precise level. In illustrative embodiments, the features input to and used to train the decision tree(s) to classify whether a distribution center 107 is in proximity to a real-time device location comprise, for example, device location data, distribution center location data, and/or location, regional and/or border restrictions that may affect or prevent component shipment from a distribution center 107 to a device location. In illustrative embodiments, "proximity" can be defined based on a threshold distance radius from a device location. For example, if a distribution center 107 is within a designated threshold radius of the device location, the distribution center 107 will be considered to be within the proximity of the device location. In illustrative embodiments, the threshold radius may be dynamically increased or decreased based on a device state derived from the recent or real-time operational data. For example, if the distribution center proximity determination layer 141 determines that component failure for a device will occur in a relatively small amount of time (e.g., under a designated threshold of time), the radius may be reduced. Alternatively, if the distribution center proximity determination layer 141 determines that component failure for a device will occur in a relatively larger amount of time (e.g., greater than a designated threshold of time), the radius may be increased. In addition, factors such as availability of component replacement expertise near a device location and/or the complexity of a device configuration can also affect whether a distribution is deemed to be in proximity to a device location. For example, if the distribution center proximity determination layer 141 determines that component replacement expertise is relatively near a device location or a device configuration is relatively simple, the radius may be increased. Alternatively, if the distribution center proximity determination layer 141 determines that component replacement expertise is relatively far from a device location or a device configuration is relatively complex, the radius may be reduced.

If a distribution center 107 identified as being in proximity to a device location is having an operational issue (e.g., overloaded capacity, output issues, equipment issues, regional issues, weather-related issues, etc.) the distribution center proximity determination layer 141 determines the next nearest distribution center 107 using a KNN algorithm. KNN is a pattern recognition algorithm that uses training data sets to find the k-closest samples. The features used to train and which are inputted to the KNN algorithm to determine the next nearest distribution center 107 may be the same or similar to those used for the decision tree(s). The KNN machine learning algorithm is a supervised learning algorithm that can be used for classification and regression predictive problems. Steps for training a machine learning model using KNN include: (i) selecting a number k for the number of neighbors (e.g., k=3); (ii) computing the Euclidean distance of k number of neighbors; (iii) taking the k-nearest neighbors as per the computed Euclidean distance; (iv) among the k neighbors, computing the number of data points in each category; and (v) where the number of neighbors is maximum, assigning a new data point to that category.

Referring to step 304, the distribution center fulfillment layer 142 causes dispatching (e.g., shipping, transporting, etc.) of replacement components from, for example, a centralized factory, to the distribution centers 107 identified as being in proximity to the device locations. In this way, replacement components can be stocked in the distribution centers 107 that are in proximity to locations of devices (e.g., user devices 102) in which components may fail or are likely to fail instead of remaining at the centralized factory. In illustrative embodiments, the distribution center fulfillment layer 142 issues an alert to devices in the centralized factory to initiate the dispatching to the distribution centers 107 identified as being in proximity to the device locations.

Referring to step 305, the distribution center command layer 143 causes distribution centers 107 to dispatch replacement components to user devices 102 at their locations based on real-time degradation data of components in the user devices 102. For example, the distribution center command layer 143 and/or the agents 103 monitor a degradation rate of at least one component in a user device 102. The degradation rate can be based on, for example, health-based metrics of a component and/or device. As noted above, health monitoring can include, for example, device or component crash data, and details about processing failures, data transmission failures, decreases in throughput, increases in latency and increased CPU and memory utilization. The degradation rate represents, for example, one or more of a rate of crashes, a rate of processing failures, a rate of data transmission failures and/or trends of decreased throughput, increased latency and increased CPU and memory utilization over designated time periods. In illustrative embodiments, the distribution center command layer 143 compares the monitored degradation rate(s) to a threshold degradation rate(s) for a component to determine whether the monitored degradation rate(s) exceeds the threshold degradation rate (s). The distribution center command layer 143 identifies a component as qualifying for replacement in response to the monitored degradation rate(s) exceeding the threshold degradation rate(s), and causes distribution centers 107 to dispatch replacement components to user devices 102 when components of the user devices 102 are identified as qualifying for replacement. In illustrative embodiments, the distribution center command layer 143 issues an alert to devices in the distribution centers 107 to initiate the dispatching of the replacement components to the user devices 102.

In illustrative embodiments, the distribution center command layer 143 prioritizes dispatching of certain replacement components over other replacement components to respective user devices 102 from the one or more distribution centers 107. The prioritizing may be based on at least one of identified component degradation rates for the respective user devices 102, predicted or previously documented durations for replacement components to reach the respective devices from the distribution centers 107, predicted or previously documented durations to replace degraded components in the respective devices with the replacement components and/or predicted or previously documented durations to test the replacement components in the respective devices. For example, higher degradation rates and longer predicted or previously documented durations will cause the distribution center command layer 143 to assign higher priority to dispatching of the replacement components corresponding to the higher degradation rates and longer predicted or previously documented durations to reach the respective devices, to replace degraded components and/or to test the replacement components.

According to one or more embodiments, the historical replacement component data repository 121, operational data repository 122, location data repository 123 and other data repositories or databases referred to herein can be configured according to a relational database management system (RDBMS) (e.g., PostgreSQL). In some embodiments, the historical replacement component data repository 121, operational data repository 122, location data repository 123 and other data repositories or databases referred to herein are implemented using one or more storage systems or devices associated with the replacement component management platform 110. In some embodiments, one or more of the storage systems utilized to implement the historical replacement component data repository 121, operational data repository 122, location data repository 123 and other data repositories or databases referred to herein comprise a scale-out all-flash content addressable storage array or other type of storage array.

The term “storage system” as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the replacement component management platform 110, the data collection engine 120, device management engine 130 and/or inventory management engine 140 in other embodiments can be implemented at least in part externally to the replacement component management platform 110, for example, as standalone servers, sets of servers or other types of systems coupled to the network 104. For example, the data collection engine 120, device management engine 130 and/or inventory management engine 140 may be provided as cloud services accessible by the replacement component management platform 110.

The data collection engine 120, device management engine 130 and/or inventory management engine 140 in the FIG. 1 embodiment are each assumed to be implemented using at least one processing device. Each such processing device generally comprises at least one processor and an associated memory, and implements one or more functional modules for controlling certain features of the data collection engine 120, device management engine 130 and/or inventory management engine 140.

At least portions of the replacement component management platform 110 and the elements thereof may be implemented at least in part in the form of software that is stored in memory and executed by a processor. The replacement component management platform 110 and the elements thereof comprise further hardware and software required for running the replacement component management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, device management engine 130, inventory management engine 140 and other elements of the replacement component management platform 110 in the present embodiment are shown as part of the replacement component management platform 110, at least a portion of the data collection engine 120, device management engine 130, inventory management engine 140 and other elements of the replacement component management platform 110 in other embodiments may be implemented on one or more other processing platforms that are accessible to the replacement component management platform 110 over one or more networks. Such elements can each be implemented at least in part within another system element or at least in part utilizing one or more stand-alone elements coupled to the network 104.

It is assumed that the replacement component management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, device management engine 130, inventory management engine 140 and other elements of the replacement component management platform 110, and the elements thereof can each be implemented in the form of one or more LXCs running on one or more VMs. Other arrangements of one or more processing devices of a processing platform can be used to implement the data collection engine 120, device management engine 130 and inventory management engine 140, as well as other elements of the replacement component management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the replacement component management platform 110 to reside in different data centers. Numerous other distributed implementations of the replacement component management platform 110 are possible.

Accordingly, one or each of the data collection engine 120, device management engine 130, inventory management engine 140 and other elements of the replacement component management platform 110 can each be implemented in a distributed manner so as to comprise a plurality of distributed elements implemented on respective ones of a plurality of compute nodes of the replacement component management platform 110.

It is to be appreciated that these and other features of illustrative embodiments are presented by way of example only, and should not be construed as limiting in any way. Accordingly, different numbers, types and arrangements of system elements such as the data collection engine 120, device management engine 130, inventory management engine 140 and other elements of the replacement component management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the replacement component management platform can be offered to cloud infrastructure customers or other users as part of FaaS, CaaS and/or PaaS offerings.

Figure 4:
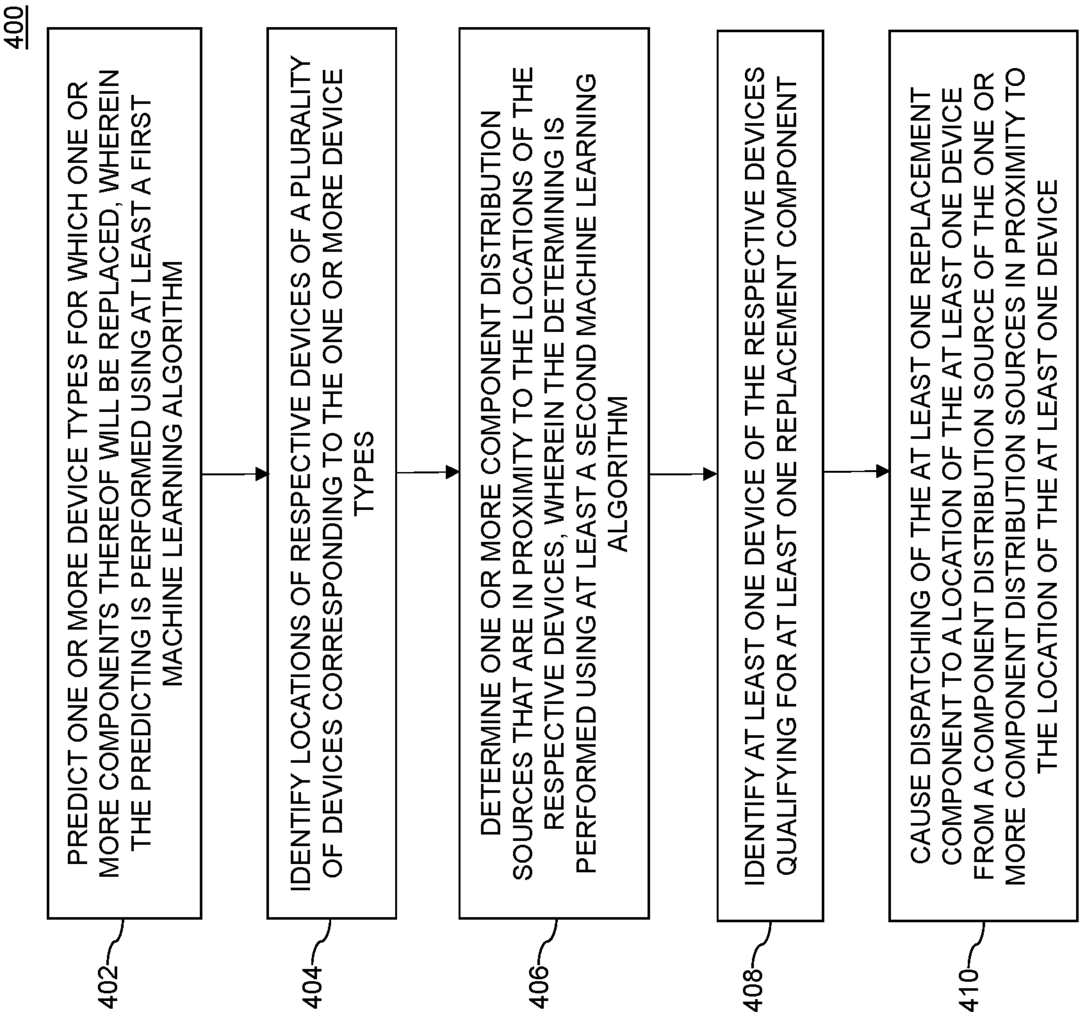
FIG. 4 is a flow diagram of an exemplary process for predicting replacement component demand and identifying locations of corresponding devices in an illustrative embodiment.

The operation of the information processing system 100 will now be described in further detail with reference to the flow diagram of FIG. 4. With reference to FIG. 4, a process 400 for replacement component management as shown includes steps 402 through 410, and is suitable for use in the system 100 but is more generally applicable to other types of information processing systems comprising a replacement component management platform configured for predicting replacement component demand and identifying locations of corresponding devices.

In step 402, one or more device types for which one or more components thereof will be replaced are predicted. The predicting is performed using at least a first machine learning algorithm. In illustrative embodiments, the first machine learning algorithm comprises a multiple linear regression algorithm, and is trained with data comprising replacement component fulfillment data for a plurality of device types.

In step 404, locations of respective devices of a plurality of devices corresponding to the one or more device types are identified. In illustrative embodiments, identifying the locations of the respective devices comprises collecting location data from respective software agents in each of the respective devices, and computing a length of time each of the respective devices have been in a given location.

In step 406, one or more component distribution sources that are in proximity to the locations of the respective devices are determined. The determining is performed using at least a second machine learning algorithm. In illustrative embodiments, the second machine learning algorithm comprises a graph convolutional network, one or more decision trees and/or a KNN algorithm. The second machine learning algorithm may be trained with a training dataset comprising replacement component fulfillment data for a plurality of devices, location data for the plurality of devices and distribution source location data.

In step 408, at least one device of the respective devices qualifying for at least one replacement component is identified. Step 410 requires causing dispatching of the at least one replacement component to a location of the at least one device from a component distribution source of the one or more component distribution sources in proximity to the location of the at least one device. The method may also include causing dispatching of the one or more replacement components to the one or more component distribution sources.

In illustrative embodiments, predicting the one or more device types for which one or more components thereof will be replaced comprises using the first machine learning algorithm to analyze an input dataset comprising one or more independent variables. In a non-limiting illustrative example, the one or more independent variables comprise, for respective device types of the one or more device types, a device model, one or more component models, one or more component firmware versions, CPU utilization, memory utilization, input-output utilization and/or operating system version.

In one or more embodiments, identifying the at least one device of the respective devices qualifying for the at least one replacement component comprises: (i) monitoring a degradation rate of at least one component in the at least one device using at least one software agent; (ii) comparing the monitored degradation rate to a threshold degradation rate for the at least one component to determine whether the monitored degradation rate exceeds the threshold degradation rate; and (iii) identifying the at least one component as qualifying for replacement in response to the monitored degradation rate exceeding the threshold degradation rate.

The method may further include prioritizing dispatching of respective ones of a plurality of replacement components to respective ones of a plurality of devices from the one or more component distribution sources based on at least one of component degradation rates of the respective ones of the plurality of devices, durations for the respective ones of the plurality of replacement components to reach the respective ones of the plurality of devices from the one or more component distribution sources, durations to replace degraded components in the respective ones of the plurality of devices with the respective ones of the plurality of replacement components and durations to test the respective ones of the plurality of replacement components in the respective ones of the plurality of devices.

It is to be appreciated that the FIG. 4 process and other features and functionality described above can be adapted for use with other types of information systems configured to execute replacement component management services in a replacement component management platform or other type of platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a replacement component management platform as disclosed herein can provide a number of significant advantages relative to conventional arrangements. For example, the replacement component management platform effectively uses machine learning techniques to predict devices that require replacement components and group the devices based on their real-time locations. By causing dispatching of the replacement components to distribution sources within the proximity of the device locations, the replacement components can be advantageously stored in distribution sources that will result in the most efficient delivery to the device location. For example, when there is an issue with a device component requiring component replacement, the component can be dispatched quickly to a device location or be replaced at the distribution source. As a result, the embodiments prevent devices from deteriorating and increase their sustainability. Moreover, the embodiments save resources by reducing shipping time and distance.

The embodiments further provide technical solutions that use machine learning to predict device types that will require component replacement and to identify component distribution sources that are in close proximity to the devices. Based on the real-time location of the devices, replacement components are dispatched to identified component distribution sources. The degradation rates of the devices are advantageously monitored so that replacement components can be proactively dispatched from the nearby distribution sources, thus reducing and/or preventing device downtime.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the replacement component management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a replacement component management platform in illustrative embodiments. These and other cloud-based systems in illustrative embodiments can include object stores.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
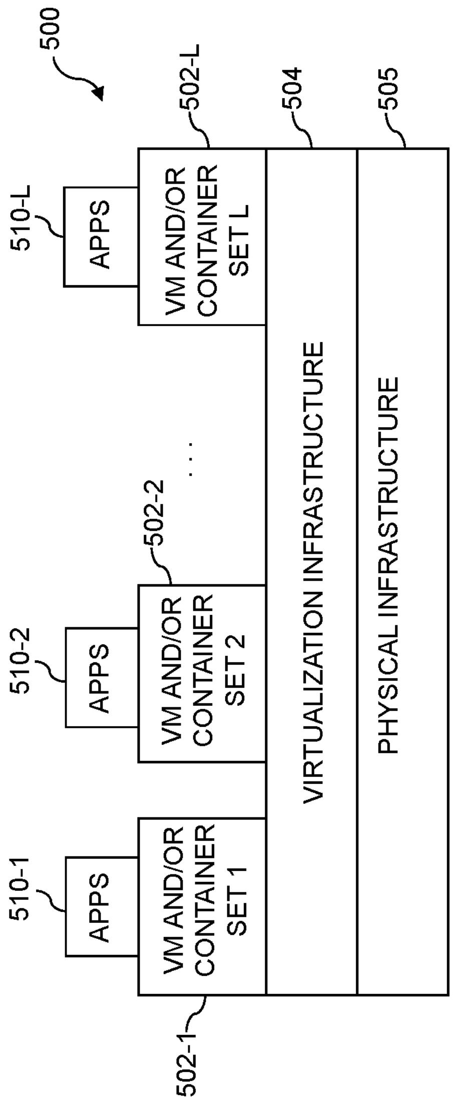
FIGS. 5 and 6 show examples of processing platforms that may be utilized to implement at least a portion of an information processing system according to illustrative embodiments.
Figure 6:
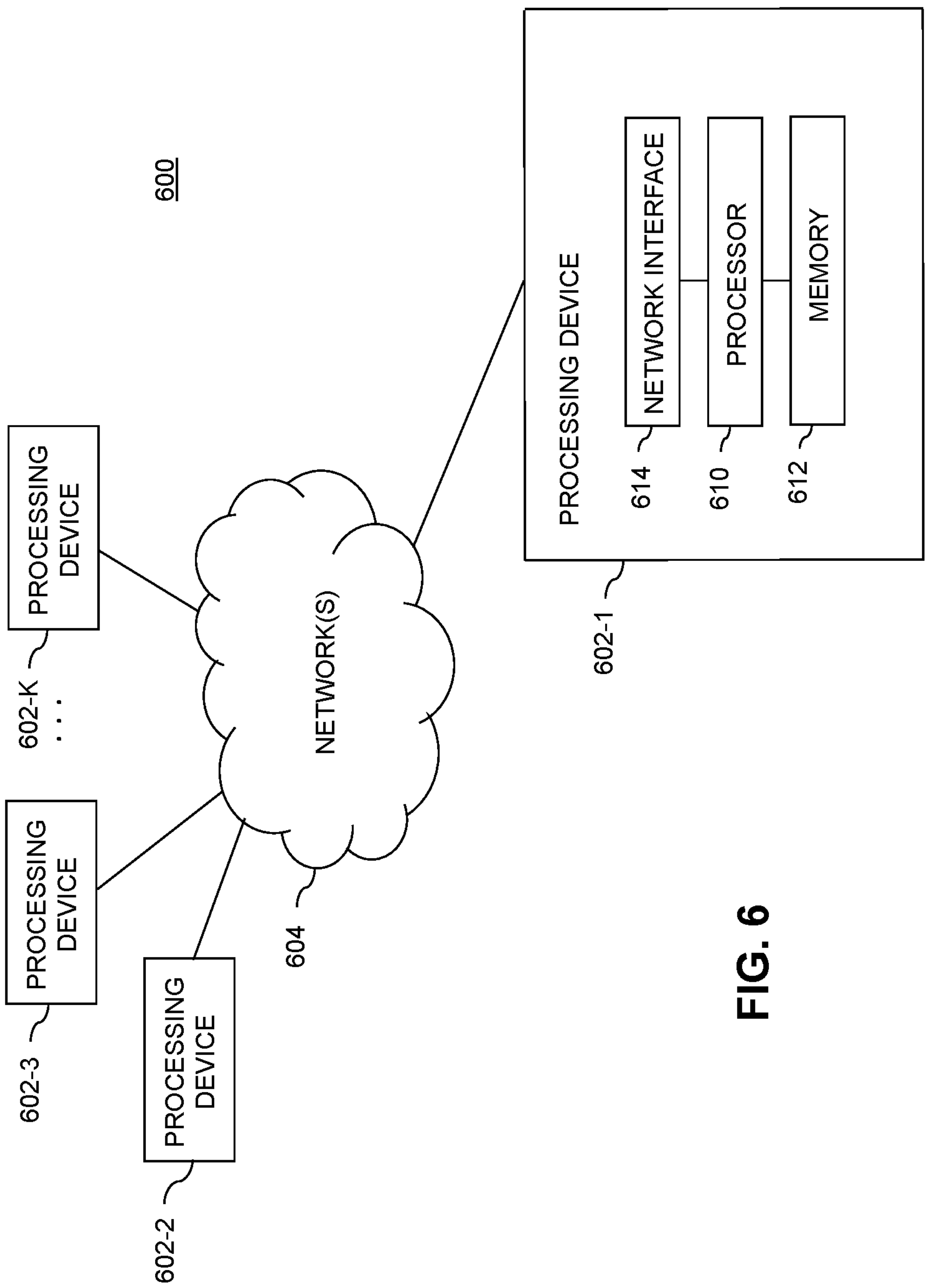

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the replacement component management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and replacement component management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

predicting one or more device types for which one or more components thereof will be replaced, wherein the predicting is performed using at least a first machine learning algorithm;

identifying locations of respective devices of a plurality of devices corresponding to the one or more device types;

determining one or more component distribution sources that are in proximity to the locations of the respective devices, wherein the determining is performed using at least a second machine learning algorithm;

identifying at least one device of the respective devices qualifying for at least one replacement component;

causing dispatching of the at least one replacement component to a location of the at least one device from a component distribution source of the one or more component distribution sources in proximity to the location of the at least one device; and further causing dispatching of respective ones of a plurality of replacement components to respective ones of a plurality of devices from the one or more component distribution sources based on at least one of component degradation rates of the respective ones of the plurality of devices, durations for the respective ones of the plurality of replacement components to reach the respective ones of the plurality of devices from the one or more component distribution sources, durations to replace degraded components in the respective ones of the plurality of devices with the respective ones of the plurality of replacement components and durations to test the respective ones of the plurality of replacement components in the respective ones of the plurality of devices;

wherein the steps of the method are executed by a processing device operatively coupled to a memory.

2. The method of claim 1 further comprising causing dispatching of one or more replacement components to the one or more component distribution sources.

3. The method of claim 1 wherein the first machine learning algorithm comprises a multiple linear regression algorithm.

4. The method of claim 1 further comprising training the first machine learning algorithm with data comprising replacement component fulfillment data for a plurality of device types.

5. The method of claim 1 wherein predicting the one or more device types for which one or more components thereof will be replaced comprises using the first machine learning algorithm to analyze an input dataset comprising one or more independent variables, wherein the one or more independent variables comprise, for respective device types of the one or more device types, at least one of a device model, one or more component models, one or more component firmware versions, central processing unit utilization, memory utilization, input-output utilization and operating system version.

6. The method of claim 1 wherein identifying the locations of the respective devices comprises collecting location data from respective software agents in each of the respective devices.

7. The method of claim 6 wherein identifying the locations of the respective devices further comprises computing a length of time each of the respective devices have been in a given location.

8. The method of claim 1 wherein the second machine learning algorithm comprises a graph convolutional network.

9. The method of claim 8 wherein the second machine learning algorithm further comprises one or more decision trees.

10. The method of claim 8 wherein the second machine learning algorithm further comprises a k-nearest neighbor algorithm.

11. The method of claim 1 wherein identifying the at least one device of the respective devices qualifying for the at least one replacement component comprises:

monitoring a degradation rate of at least one component in the at least one device using at least one software agent;

comparing the monitored degradation rate to a threshold degradation rate for the at least one component to determine whether the monitored degradation rate exceeds the threshold degradation rate; and identifying the at least one component as qualifying for replacement in response to the monitored degradation rate exceeding the threshold degradation rate.

12. The method of claim 1 further comprising prioritizing dispatching of the respective ones of the plurality of replacement components to the respective ones of the plurality of devices from the one or more component distribution sources.

13. The method of claim 1 further comprising training the second machine learning algorithm with a training dataset comprising replacement component fulfillment data for a plurality of devices, location data for the plurality of devices and distribution source location data.

14. An apparatus comprising:

a processing device operatively coupled to a memory and configured:

to predict one or more device types for which one or more components thereof will be replaced, wherein the predicting is performed using at least a first machine learning algorithm;

to identify locations of respective devices of a plurality of devices corresponding to the one or more device types;

to determine one or more component distribution sources that are in proximity to the locations of the respective devices, wherein the determining is performed using at least a second machine learning algorithm;

to identify at least one device of the respective devices qualifying for at least one replacement component;

to cause dispatching of the at least one replacement component to a location of the at least one device from a component distribution source of the one or more component distribution sources in proximity to the location of the at least one device; and to further cause dispatching of respective ones of a plurality of replacement components to respective ones of a plurality of devices from the one or more component distribution sources based on at least one of component degradation rates of the respective ones of the plurality of devices, durations for the respective ones of the plurality of replacement components to reach the respective ones of the plurality of devices from the one or more component distribution sources, durations to replace degraded components in the respective ones of the plurality of devices with the respective ones of the plurality of replacement components and durations to test the respective ones of the plurality of replacement components in the respective ones of the plurality of devices.

15. The apparatus of claim 14 wherein the processing device is further configured to train the first machine learning algorithm with data comprising replacement component fulfillment data for a plurality of device types.

16. The apparatus of claim 14 wherein, in predicting the one or more device types for which one or more components thereof will be replaced, the processing device is configured to use the first machine learning algorithm to analyze an input dataset comprising one or more independent variables, wherein the one or more independent variables comprise, for respective device types of the one or more device types, at least one of a device model, one or more component models, one or more component firmware versions, central processing unit utilization, memory utilization, input-output utilization and operating system version.

17. The apparatus of claim 14 wherein, in identifying the at least one device of the respective devices qualifying for the at least one replacement component, the processing device is configured:

to monitor a degradation rate of at least one component in the at least one device using at least one software agent;

to compare the monitored degradation rate to a threshold degradation rate for the at least one component to determine whether the monitored degradation rate exceeds the threshold degradation rate; and to identify the at least one component as qualifying for replacement in response to the monitored degradation rate exceeding the threshold degradation rate.

18. An article of manufacture comprising a non-transitory processor-readable storage medium having stored therein program code of one or more software programs, wherein the program code when executed by at least one processing device causes said at least one processing device to perform the steps of:

predicting one or more device types for which one or more components thereof will be replaced, wherein the predicting is performed using at least a first machine learning algorithm;

identifying locations of respective devices of a plurality of devices corresponding to the one or more device types;

determining one or more component distribution sources that are in proximity to the locations of the respective devices, wherein the determining is performed using at least a second machine learning algorithm;

identifying at least one device of the respective devices qualifying for at least one replacement component;

causing dispatching of the at least one replacement component to a location of the at least one device from a component distribution source of the one or more component distribution sources in proximity to the location of the at least one device; and further causing dispatching of respective ones of a plurality of replacement components to respective ones of a plurality of devices from the one or more component distribution sources based on at least one of component degradation rates of the respective ones of the plurality of devices, durations for the respective ones of the plurality of replacement components to reach the respective ones of the plurality of devices from the one or more component distribution sources, durations to replace degraded components in the respective ones of the plurality of devices with the respective ones of the plurality of replacement components and durations to test the respective ones of the plurality of replacement components in the respective ones of the plurality of devices.

19. The article of manufacture of claim 18 wherein, in predicting the one or more device types for which one or more components thereof will be replaced, the program code causes said at least one processing device to use the first machine learning algorithm to analyze an input dataset comprising one or more independent variables, wherein the one or more independent variables comprise, for respective device types of the one or more device types, at least one of a device model, one or more component models, one or more component firmware versions, central processing unit utilization, memory utilization, input-output utilization and operating system version.

20. The article of manufacture of claim 18 wherein, in identifying the at least one device of the respective devices qualifying for the at least one replacement component, the program code causes said at least one processing device:

to monitor a degradation rate of at least one component in the at least one device using at least one software agent;

to compare the monitored degradation rate to a threshold degradation rate for the at least one component to determine whether the monitored degradation rate exceeds the threshold degradation rate; and to identify the at least one component as qualifying for replacement in response to the monitored degradation rate exceeding the threshold degradation rate.

* * * * *